(12) United States Patent
LaPierre et al.

(10) Patent No.: US 8,014,513 B2
(45) Date of Patent: Sep. 6, 2011

(54) CALLER IDENTIFICATION THROUGH NON-TEXTUAL OUTPUT

(75) Inventors: Stephen LaPierre, Union City, GA (US); Jim Reed, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1365 days.

(21) Appl. No.: 11/299,519

(22) Filed: Dec. 12, 2005

(65) Prior Publication Data

US 2007/0133770 A1   Jun. 14, 2007

(51) Int. Cl.
*H04M 1/00* (2006.01)
*H04M 3/00* (2006.01)

(52) U.S. Cl. ............................... 379/373.02; 379/373.03

(58) Field of Classification Search ............. 379/373.02, 379/373.03
See application file for complete search history.

(56) References Cited

U.S. PATENT DOCUMENTS

| | | | |
|---|---|---|---|
| 5,559,860 A * | 9/1996 | Mizikovsky | 455/413 |
| 7,602,901 B1 * | 10/2009 | Kates et al. | 379/373.01 |
| 2003/0140088 A1 * | 7/2003 | Robinson et al. | 709/202 |
| 2008/0066609 A1 * | 3/2008 | Bourgeois | 84/609 |

* cited by examiner

*Primary Examiner* — Alexander Jamal
(74) *Attorney, Agent, or Firm* — Cantor Colburn LLP

(57) ABSTRACT

Caller identification information is conveyed to the called party in manners other than through the display of textual information on a display screen. The caller ID information may be provided as musical tones where the characters of the caller ID information are mapped to the musical tones being output, such as various musical notes and length of the note. The caller ID information may be provided as a light pattern where the characters of the caller ID information are mapped to the elements of the light pattern being output, such as colors, period of light, and flashes. The caller ID information may be provided as tactile patterns where the characters of the caller ID information are mapped to the elements of the tactile pattern being output, such as producing vibration patterns or Braille characters. The called party may then recognize the caller from the conveyed caller ID information.

3 Claims, 1 Drawing Sheet

CALLER IDENTIFICATION THROUGH NON-TEXTUAL OUTPUT

TECHNICAL FIELD

The present invention is related to caller identification. More particularly, the present invention is related to conveying caller identification information through non-textual output.

BACKGROUND

Caller identification, or caller ID, is a commonplace mechanism for allowing a called party to discover the identity of the calling party prior to answering the call. Thus, callers can screen calls or otherwise prepare for answering a call upon learning who the calling party is. Traditionally, caller ID information is conveyed via a display screen, either on a telephone or a stand-alone box. The caller ID service offers the subscriber the option to have calling number only, or calling number and calling name.

While caller ID is a useful tool, the subscriber must be capable of reading the display screen upon an incoming call occurring to benefit from the caller ID information. For visually impaired subscribers, the display screen is not a feasible manner of conveying the caller ID information. Additionally, it is burdensome for the subscriber to be in proximity to the display screen upon each incoming call occurring.

SUMMARY

Exemplary embodiments address these issues and others by providing caller identification through non-textual outputs such that the caller ID information can be conveyed without requiring the subscriber to read it. For example, the caller ID information may be conveyed by creating musical tones for the characters present in the caller ID information and in such a case no visual acuity is needed. As another example, the caller ID information may be conveyed by light patterns such as varying the color of a light based on the characters present in the caller ID information. As yet another example, the caller ID information may be conveyed by vibration patterns such as varying the vibrations based on the characters present in the caller ID information.

One embodiment is a device for providing musical tones for purposes of caller identification. The device includes a decoder that receives caller ID data for an incoming telephone call and decodes the caller ID data into characters. The device further includes a processor that translates characters decoded by the decoder to musical tone data. Additionally, the device includes a tone generator that audibly produces musical tones corresponding to the musical tone data resulting from the translation by the processor.

Another embodiment is a device for providing light patterns for purposes of caller identification. The device includes a decoder that receives caller ID data for an incoming telephone call and decodes the caller ID data into characters. The device further includes a processor that translates characters decoded by the decoder to light data. The device additionally includes a light source that produces light patterns corresponding to the light data resulting from the translation by the processor.

Another embodiment is a device for providing tactile patterns for purposes of caller identification. The device includes a decoder that receives caller ID data for an incoming telephone call and decodes the caller ID data into characters. The device further includes a processor that translates characters decoded by the decoder to tactile data. Additionally, the device includes a tactile source that produces tactile patterns corresponding to the tactile data resulting from the translation by the processor.

DETAILED DESCRIPTION

Embodiments convey caller ID information to called parties via non-textual outputs so that the called party does not need to read the caller ID display screen in order to determine an origin of the incoming call. The non-textual output may involve translating characters of the caller ID information into musical tones, into light patterns, or into vibration patterns.

Figure 1:
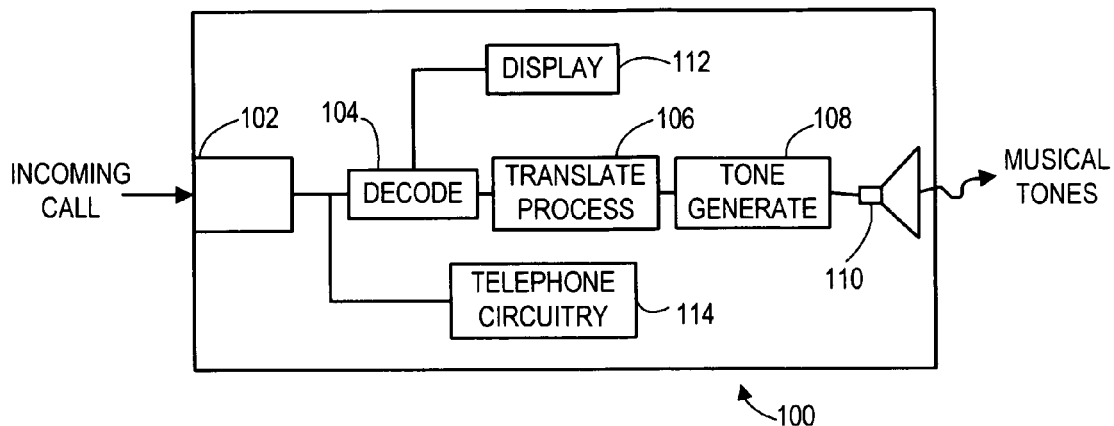
FIG. 1 shows a diagram of components of an illustrative device for providing musical tones corresponding to the caller ID information.

FIG. 1 shows one example of a device for conveying caller ID information. The device 100 may be a stand-alone device used in conjunction with a separate landline telephone, or the device 100 may alternatively be a mobile phone or a landline telephone that incorporates the components that convey the caller ID information through non-textual outputs. In the particular example of FIG. 1, the non-textual output includes musical tones that are generated based on the characters present in the caller ID information.

The device 100 includes an input port 102 that interfaces to the telecommunications network. For example, the input port 102 may be an RJ-11 port that connects directly to a plain old telephone service (POTS) jack. Alternatively, the input port 102 may be a radio transceiver system that connects over-the-air to a base station for establishing mobile phone service. The incoming call is received via the input port 102, and the incoming call includes the caller ID data encoded into the incoming signal.

Upon the incoming signal being received, a caller ID decoder 104 decodes the caller ID signal to extract the caller ID characters in the standard way. The caller ID characters may include letters, number, and symbols depending upon the type of caller ID service that the called party is being provided. A calling number service provides only the number of the calling party while a calling name and number service provides both the number and the name of the calling party. Thus, the string of characters output by the decoder 104 may contain numbers for calling name service or numbers, letters, and/or symbols for calling name and number service. Furthermore, the called party may subscribe to a caller ID-call waiting service such that the caller ID data is provided for incoming calls that occur while another call is in progress in addition to providing the caller ID data for an incoming call when no other call is in progress.

Upon the caller ID character string being output by the decoder 104, a processor 106 implementing a translation process translates the incoming string of characters into, e.g., musical tones. In this manner, each string of caller ID characters will map to a different set of musical tones such that the called party may begin to recognize the caller by the sequence of musical tones being generated for that caller. The processor 106 may be configured to translate the string in various ways. For example, each character may map to a unique musical tone. As another example, the processor 106 may translate groups of characters, such as the area code or exchange code, into a musical tone or set of musical tones.

Additionally, the processor 106 may use more sophisticated translation. As one example, the processor 106 may recognize local area codes and translate local area codes into one musical tone that signals that the call is local as opposed to a long distance caller. As another example, the processor 106 may alter the length of musical tones by recognizing certain character sequences that call for a particular sequence of musical tones where each tone of the sequence is assigned a tone length that may be different than the preceding tone.

The processor 106 may also receive user input to configure the translation. User input may be entered via an input device such as a keypad that provides data to the processor 106. As one example of implementing user input, the user may specify whether to translate each character into an individual musical tone or whether to translate groups of characters into a single tone. The user may specify whether to vary the tone lengths, specify particular character sequences and the variation of the tone lengths to be used (e.g., 9, 7, 8 is short, long, short). The user may also select to use musical tones of one instrument versus another for all characters or for certain characters.

The processor 106 outputs tone data to a tone generator 108. The tone data output by the processor 106 instructs the tone generator to produce a musical tone or sequence of musical tones which is amplified. The musical tones are made audible by a speaker 110 that receives the amplified musical tone signal. Accordingly, the caller ID information is conveyed as a sequence of musical tones to the called party so that the called party can hear the musical tones and recognize the caller rather than being required to read a display screen.

The decoder 104, processor 106, and tone generator 108 are shown as separate blocks in FIG. 1. These functional elements represented by each of these blocks may be implemented as separate devices, typically in the form of individual integrated circuits. Alternatively, these functional elements may be implemented together within a single device such as an application specific integrated circuit (ASIC). Furthermore, the logic of decoding, translating, and generating tones may be represented in the form of instructions encoded on a computer readable medium, such as an electronic, magnetic, or optical memory device or as a propagated signal within a wired or wireless transmission system. The instructions may be implemented by the functional elements to provide the non-textual caller ID output.

While the device 100 conveys caller ID information via musical tones, the device 100 may also include additional features, such as standard POTS or cellular telephone circuitry 114 where the device 100 itself is a telephone. Additionally, the device 100 may include a standard display screen 112, such as a liquid crystal display (LCD) and the decoder 104 outputs the caller ID characters to the display screen 112 where they are displayed for the called party should the called party wish to read the caller ID information.

Table 1 illustrates one example of the mapping that may be done by the processor 106 to provide the musical tones indicative of number caller ID information where each tone corresponds to a particular musical note and length. While Table 1 shows that an individual musical note is produced, it will be appreciated that combinations of notes may be produced to generate harmonics including chords.

TABLE 1

Translation to Musical Tones

| Digit of Caller ID | Musical Tone, Length |
|---|---|
| 0 | A (440 Hz), .5 sec. |
| 1 | B (494 Hz), 1 sec. |
| 2 | C (523 Hz), .5 sec. |
| 3 | D (587 Hz), 1 sec. |
| 4 | E (659 Hz), .5 sec. |
| 5 | F (698 Hz), 1 sec. |
| 6 | G (784 Hz), .5 sec. |
| 7 | A (880 Hz), 1 sec. |
| 8 | B (988 Hz), .5 sec. |
| 9 | C (1046 Hz), 1 sec. |

Figure 2:
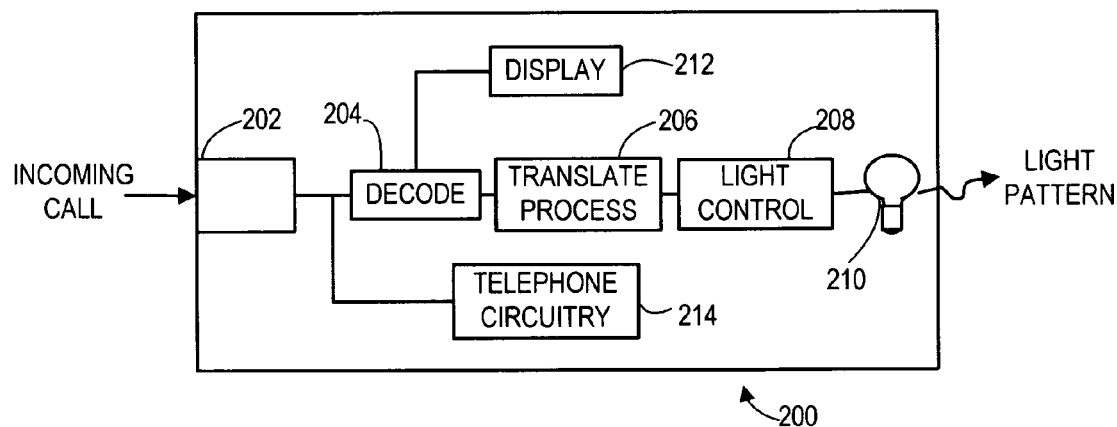
FIG. 2 shows a diagram of components of an illustrative device for providing light patterns corresponding to the caller ID information.

FIG. 2 shows another example of a device for conveying caller ID information. Like the device 100 of FIG. 1, the device 200 may be a stand-alone device used in conjunction with a separate landline telephone, or the device 200 may alternatively be a mobile phone or a landline telephone that incorporates the components that convey the caller ID information through non-textual outputs. In the particular example of FIG. 2, the non-textual output is patterns of light that are generated based on the characters present in the caller ID information.

The device 200 includes an input port 202 that interfaces to the telecommunications network. As with device 100, the input port 202 may be an RJ-11 port that connects directly to a POTS jack. Alternatively, the input port 202 may be a radio transceiver system that connects over-the-air to a base station for establishing mobile phone service. The incoming call is received via the input port 202, and the incoming call includes the caller ID data encoded into the incoming signal.

Upon the incoming signal being received, a caller ID decoder 204 decodes the caller ID signal to extract the caller ID characters in the standard way. As discussed above, the caller ID characters may include letters, number, and symbols depending upon the type of caller ID service that the called party is being provided. The string of characters output by the decoder 204 may contain numbers for calling name service or numbers, letters, and/or symbols for calling name and number service. Furthermore, the called party may subscribe to a caller ID-call waiting service such that the caller ID data is provided for incoming calls that occur while another call is in progress in addition to providing the caller ID data for an incoming call when no other call is in progress.

Upon the caller ID character string being output by the decoder 204, a processor 206 implementing a translation process translates the incoming string of characters into, e.g., patterns of light. In this manner, each string of caller ID characters will map to a different pattern of light such that the called party may begin to recognize the caller by the pattern of light being generated for that caller. The processor 206 may be configured to translate the string in various ways. For example, each character may map to a unique color or number of flashes. As another example, the processor 206 may translate groups of characters, such as the area code or exchange code, into a color or number of flashes. As yet another example, the pattern of light might be a Braille code for each character of the caller ID.

Additionally, the processor 206 may use more sophisticated translation. As one example, the processor 206 may recognize local area codes and translate local area codes into one color or number of flashes that signals that the call is local as opposed to a long distance caller. As another example, the processor 206 may alter the length of each flash of light by recognizing certain character sequences that call for a particular sequence of colors or flashes of light where each color or flash of the sequence is assigned a length that may be different than the preceding color of flash.

The processor 206 may also receive user input to configure the translation. User input may be entered via an input device such as a keypad that provides data to the processor 206. As one example of implementing user input, the user may specify whether to translate each character into an individual color or number of flashes or whether to translate groups of characters into a single color of number of flashes. The user may specify whether to vary the lengths of each color or flash, specify particular character sequences and the variation of the colors or number of flashes to be used (e.g., 9, 7, 8 is short red, long blue, short green).

The processor 206 outputs light data to a light controller 208. The light data output by the processor 206 instructs the light controller 208 to produce a particular color of light or sequence of colors. The pattern of lights including the sequence of colors and/or flashes is made visible by a light emitter 210 that receives the light control signal. The light controller 208 outputs a signal that has a voltage level, bulb destination, and/or period (on-time) that controls the color and/or flashing of the light emitter 210. The light emitter 210 may be a series of individually addressable bulbs of varying color or a light source otherwise capable of varying color, such as a neon light. Accordingly, the caller ID information is conveyed as a sequence of colors of flashes to the called party so that the called party can see the pattern of light being emitted and recognize the caller rather than being required to read a display screen. Furthermore, the light emitter 210 may be a set of lights forming one or more Braille cells so that each character may be displayed in Braille, sequentially by a single cell or simultaneously by a block of cells, by activating the appropriate lights of the Braille cell(s).

Similar to the discussion above in relation to FIG. 1, the decoder 204, processor 206, and light controller 208 are shown as separate blocks in FIG. 2. These functional elements represented by each of these blocks may be implemented as separate devices, typically in the form of individual integrated circuits. Alternatively, these functional elements may be implemented together within a single device such as an application specific integrated circuit (ASIC). Furthermore, the logic of decoding, translating, and generating patterns of light may be represented in the form of instructions encoded on a computer readable medium, such as an electronic, magnetic, or optical memory device or as a propagated signal within a wired or wireless transmission system. The instructions may be implemented by the functional elements to provide the non-textual caller ID output.

While the device 200 conveys caller ID information via patterns of light, the device 200 may also include additional features, such as standard POTS or cellular telephone circuitry 214 where the device 200 itself is a telephone. Additionally, the device 200 may include a standard display screen 212, such as an LCD and the decoder 204 outputs the caller ID characters to the display screen 212 where they are displayed for the called party should the called party wish to read the caller ID information.

Table 2 illustrates one example of the mapping that may be done by the processor 206 to provide the pattern of light indicative of number caller ID information where each pattern corresponds to a particular color and length. While Table 2 shows that an individual color is produced, it will be appreciated that transitions of colors and flashes may be produced to generate other visually distinguishable effects.

TABLE 2

Translation to Light Patterns

| Digit of Caller ID | Color, Length |
|---|---|
| 0 | Red, .5 sec. |
| 1 | Orange, 1 sec. |
| 2 | Yellow, .5 sec. |
| 3 | Light Green, 1 sec. |
| 4 | Light Blue, .5 sec. |
| 5 | Purple, 1 sec. |
| 6 | White, .5 sec. |
| 7 | Pink, 1 sec. |
| 8 | Dark Blue, .5 sec. |
| 9 | Dark Green, 1 sec. |

Figure 3:
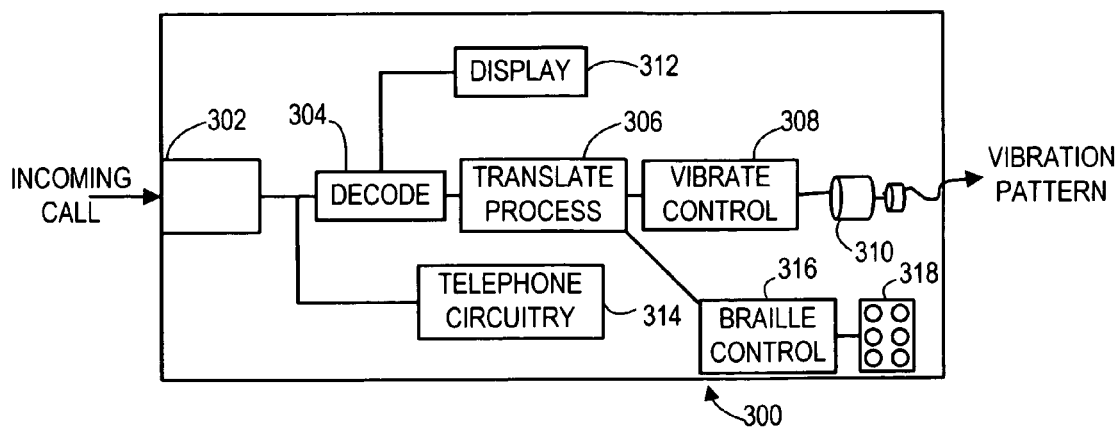
FIG. 3 shows a diagram of components of an illustrative device for providing vibration patterns corresponding to the caller ID information.

FIG. 3 shows another example of a device for conveying caller ID information. Like the device 100 of FIG. 1, the device 300 may be a stand-alone device used in conjunction with a separate landline telephone, or the device 300 may alternatively be a mobile phone or a landline telephone that incorporates the components that convey the caller ID information through non-textual outputs. In the particular example of FIG. 3, the non-textual output is patterns of vibration that are generated based on the characters present in the caller ID information. For example, the embodiment of FIG. 3 may be useful where the device is incorporated into a telephone that has a ringer set to a vibration mode, and where the vibration is provided in a pattern to convey the caller ID information.

The device 300 includes an input port 302 that interfaces to the telecommunications network. As with device 100, the input port 302 may be an RJ-11 port that connects directly to a POTS jack. Alternatively, the input port 302 may be a radio transceiver system that connects over-the-air to a base station for establishing mobile phone service. The incoming call is received via the input port 302, and the incoming call includes the caller ID data encoded into the incoming signal.

Upon the incoming signal being received, a caller ID decoder 304 decodes the caller ID signal to extract the caller ID characters in the standard way. As discussed above, the caller ID characters may include letters, number, and symbols depending upon the type of caller ID service that the called party is being provided. The string of characters output by the decoder 304 may contain numbers for calling name service or numbers, letters, and/or symbols for calling name and number service. Furthermore, the called party may subscribe to a caller ID-call waiting service such that the caller ID data is provided for incoming calls that occur while another call is in progress in addition to providing the caller ID data for an incoming call when no other call is in progress.

Upon the caller ID character string being output by the decoder 304, a processor 306 implementing a translation process translates the incoming string of characters into, e.g., a tactile pattern such as patterns of vibration or Braille patterns. In this manner, each string of caller ID characters will map to a different tactile pattern such that the called party may begin to recognize the caller by the tactile pattern being generated for that caller. The processor 306 may be configured to translate the string in various ways. For example and in relation to vibration patterns, each character may map to a unique length of a vibration period (i.e., on-time), unique number of vibration bursts, of frequency (rotational speed) of vibration. As another example in relation to vibration patterns, the processor 306 may translate groups of characters, such as the area code or exchange code, into a vibration period, number of vibration bursts, or period of vibration. Another example is translating the caller ID characters into the corresponding Braille characters.

Additionally, the processor 306 may use more sophisticated translation. As one example, the processor 306 may recognize local area codes and translate local area codes into one length of a vibration period, a number of vibration bursts, or a vibration frequency that signals that the call is local as opposed to a long distance caller. As another example, the processor 306 may alter the length of each period of vibration by recognizing certain character sequences that call for a particular sequence of vibration periods where each period of vibration of the sequence is assigned a length that may be different than the preceding period The processor 306 may also receive user input to configure the translation. User input may be entered via an input device such as a keypad that provides data to the processor 306. As one example of implementing user input, the user may specify whether to translate each character into an individual length of vibration, number of bursts, or frequency of vibration or whether to translate groups of characters into a single period of vibration, a number of bursts, or a frequency of vibration. The user may specify whether to vary the lengths of each vibration period or number of bursts, specify particular character sequences and the variation of the vibration period or number of bursts to be used (e.g., 9, 7, 8 is one short burst, one long bursts, two short bursts).

The processor 306 outputs tactile data to an appropriate controller. The tactile data output by the processor 306 instructs a controller accordingly. For example, in one embodiment the processor 306 may instruct a vibration controller 308 to produce a vibration of a particular period or frequency. The pattern of vibration including the period, bursts, and/or frequency is made visible by a vibration motor 310 (e.g., eccentrically weighted) that receives the vibration control signal. Accordingly, the caller ID information is conveyed as a sequence of vibration periods or frequencies to the called party so that the called party can feel the pattern of vibration being emitted and recognize the caller rather than being required to read a display screen. In another embodiment, the processor 306 instructs a Braille controller 316 to produce a particular character at a time, and the Braille controller 316 then produces the corresponding control signal to cause one or more mechanical Braille cells 310 to provide the corresponding characters in Braille code as a series of raised bumps, either sequentially by one cell or simultaneously by a block of cells.

Similar to the discussion above in relation to FIGS. 1 and 2, the decoder 304, processor 306, vibration controller 308, and Braille controller 316 are shown as separate blocks in FIG. 3. These functional elements represented by each of these blocks may be implemented as separate devices, typically in the form of individual integrated circuits. Alternatively, these functional elements may be implemented together within a single device such as an application specific integrated circuit (ASIC). Furthermore, the logic of decoding, translating, and generating tactile patterns may be represented in the form of instructions encoded on a computer readable medium, such as an electronic, magnetic, or optical memory device or as a propagated signal within a wired or wireless transmission system. The instructions may be implemented by the functional elements to provide the non-textual caller ID output.

While the device 300 conveys caller ID information via tactile patterns, the device 300 may also include additional features, such as standard POTS or cellular telephone circuitry 314 where the device 300 itself is a telephone. Additionally, the device 300 may include a standard display screen 312, such as an LCD and the decoder 304 outputs the caller ID characters to the display screen 312 where they are displayed for the called party should the called party wish to read the caller ID information.

Table 3 illustrates one example of the mapping that may be done by the processor 306 to provide the pattern of vibration indicative of number caller ID information where each pattern corresponds to a particular frequency and period. While Table 3 shows that an individual frequency is produced, it will be appreciated that transitions of frequency and flashes may be produced to generate other tactilely distinguishable effects.

TABLE 3

Translation to Vibration Patterns

| Digit of Caller ID | Frequency, Length |
|---|---|
| 0 | 300 rpm, .5 sec. |
| 1 | 600 rpm, 1 sec. |
| 2 | 1200 rpm, .5 sec. |
| 3 | 2400 rpm, 1 sec. |
| 4 | 4800 rpm, .5 sec. |
| 5 | 7200 rpm, 1 sec. |
| 6 | 9600 rpm, .5 sec. |
| 7 | 12,000 rpm, 1 sec. |
| 8 | 14,400 rpm, .5 sec. |
| 9 | 16,800 rpm, 1 sec. |

In each of the embodiments above, the caller ID information is conveyed in a non-textual manual so that the called party can discern who is calling without reading a caller ID display. Accordingly, the burden placed on the called party to view the caller ID display screen and read its contents may be reduced.

While the invention has been particularly shown and described with reference to various embodiments thereof, it will be understood by those skilled in the art that various other changes in the form and details may be made therein without departing from the spirit and scope of the invention.

What is claimed is:

1. A device for providing light patterns for purposes of caller identification, comprising:
    a decoder that receives caller ID data for an incoming telephone call and decodes the caller ID data into characters;
    a processor that translates characters decoded by the decoder to light data, wherein the processor recognizes local area codes and translates local area codes into light data corresponding to a number of non-textual flashes that signals that the call is local as opposed to a long distance caller, wherein the processor translates each character into a unique color in creating the light data, wherein each color in a sequence of colors corresponding to the characters is assigned a flash length that is different than a flash length of a preceding color in the sequence; and
    a light source that produces non-textual light patterns corresponding to the light data resulting from the translation by the processor.

2. A device for providing tactile patterns for purposes of caller identification, comprising:
    a decoder that receives caller ID data for an incoming telephone call and decodes the caller ID data into characters;
    a processor that translates characters decoded by the decoder to tactile data, wherein the processor recognizes local area codes and translates local area codes to one tactile data that signals that the call is local as opposed to a long distance caller, wherein the processor translates each character into a unique vibration burst in creating the tactile data, wherein each vibration burst in a sequence of vibration bursts corresponding to the characters is assigned a vibration period that is different than a vibration period of a preceding vibration burst in the sequence; and a tactile source that produces tactile patterns corresponding to the tactile data resulting from the translation by the processor.

3. The device of claim 2, wherein the tactile patterns include Braille.

* * * * *